United States Patent [19]

Daggett et al.

[11] Patent Number: 5,754,124

[45] Date of Patent: May 19, 1998

[54] ELECTRICAL HAZARD WARNING SYSTEM

[75] Inventors: David M. Daggett, Ventura; David A. Graves, Woodbridge, both of Calif.

[73] Assignee: Pittco, Inc., Ventura, Calif.

[21] Appl. No.: 748,691

[22] Filed: Nov. 13, 1996

[51] Int. Cl.[6] .................. B60Q 7/00; F21L 7/00; H01M 10/44

[52] U.S. Cl. .................. 340/908.1; 340/908; 340/471; 362/183; 320/5

[58] Field of Search .................. 340/473, 907, 340/908, 908.1, 471, 321, 331, 332; 362/190, 191, 186, 158, 183; 40/612; 307/150; 320/5, 14, 30

[56] References Cited

U.S. PATENT DOCUMENTS

| | | | |
|---|---|---|---|
| 3,132,624 | 5/1964 | Shoemaker, Jr. | 340/908.1 |
| 3,732,842 | 5/1973 | Vara, Sr. | 340/908.1 |
| 3,781,631 | 12/1973 | Nelson et al. | 320/25 |
| 3,980,989 | 9/1976 | Bluhm | 340/908 |
| 4,127,844 | 11/1978 | Purdy | 340/471 |
| 4,141,367 | 2/1979 | Ferreira | 607/27 |
| 4,270,080 | 5/1981 | Lostecki | 320/24 |
| 4,605,993 | 8/1986 | Zelina, Jr. | 362/183 |
| 4,645,341 | 2/1987 | Liao | 362/183 |
| 4,727,620 | 3/1988 | Gummelt | 16/115 |
| 4,751,622 | 6/1988 | Williams | 340/908.1 |
| 4,951,045 | 8/1990 | Knapp et al. | 340/944 |
| 5,010,454 | 4/1991 | Hopper | 362/183 |
| 5,103,383 | 4/1992 | Mayhew | 362/183 |
| 5,214,793 | 5/1993 | Conway et al. | 340/905 |
| 5,294,924 | 3/1994 | Dydzyk | 340/908.1 |
| 5,319,365 | 6/1994 | Hillinger | 340/908.1 |
| 5,392,203 | 2/1995 | Harris, Jr. | 362/186 |
| 5,453,729 | 9/1995 | Chu | 340/908.1 |
| 5,521,595 | 5/1996 | Totten et al. | 340/908.1 |
| 5,577,824 | 11/1996 | Wright | 340/908.1 |
| 5,621,298 | 4/1997 | Harvey | 320/5 |

OTHER PUBLICATIONS

Horowitz and Hill, *The Art of Electronics*, Cambridge University Press, 1989, pp. 357–360.

Fink and Christiansen, *Electronic Engineers' Handbook*, McGraw–Hill, Inc. 1989, pp. 11–9 to 11–10.

*Primary Examiner*—Brent A. Swarthout
*Assistant Examiner*—Van T. Trieu
*Attorney, Agent, or Firm*—Koppel & Jacobs

[57] ABSTRACT

An electrical hazard warning system includes a number of rechargeable electrical hazard markers and a charger/storage unit. The hazard markers each include a rechargeable battery that supplies power to a flash tube, and have a lightweight, non-skidding, topple-resistant, cone-shaped housing designed for use in all weather conditions. The markers have two switch-selectable brightness levels and are effective in either daylight or darkness. When not deployed, the markers are kept in the charger/storage unit, which fits into the trunk of a car and is equipped with multiple charging stations. Each station is protected by a circuit breaker and includes a station status light. The hazard markers illuminate immediately upon removal from the charger/storage unit, and can be placed on the roadway as needed to provide a highly visible warning.

47 Claims, 5 Drawing Sheets

ELECTRICAL HAZARD WARNING SYSTEM

BACKGROUND OF THE INVENTION

1. Field of the Invention

This invention relates to the field of hazard warning systems, particularly electrically-powered hazard warning systems.

2. Description of the Related Art

Serious mishaps occur on our streets and highways with great frequency, which often results in the creation of a hazard in the roadway. Authorities charged with clearing the roadway commonly place some type of hazard marker or markers around the problem area, to protect the public from being injured by the calamity or from driving or walking into the scene, and to protect those performing the clean-up chores from intrusions by the public. Hazard markers in common use on our highways include flares, sequentially-illuminated arrows, message signs, wooden horse-type barricades which usually feature a blinking warning light, and the familiar orange cones.

Highway flares are one of the most commonly used hazard markers, despite having a number of serious shortcomings. Though having the advantage of being easily visible at night, the fact that they operate by means of fire poses a number of problems. The person charged with igniting the flare risks burning their clothes, skin, or eyes. Placing the flare on the road poses a fire risk to the people and vehicles that must necessarily pass close by the crowded accident scene, as well as to surrounding brush. The fumes created by the flare's burning chemicals exhaust into the atmosphere and degrade our environment, and burn marks can be left on the pavement.

Electrically-powered hazard markers are rather large, requiring a considerable amount of storage space and transport capacity. Some, such as sequentially-illuminated arrows and message signs, must typically be towed to the scene, and even a small number of wooden barricades will fill the trunk of a police car. Message signs and arrows contain a large number of light bulbs and as such require a considerable amount of power to operate. This results in a short battery life, or in some cases, the necessity of using a gasoline-powered generator to power the device. This type of hazard marker also requires a high-level of maintenance to insure that the bulbs are working and that the marker is properly communicating the danger to the public.

Orange cones are excellent low-maintenance hazard markers that are easily stored and transported, but have the obvious disadvantage of not being readily visible at night or in poor weather conditions.

SUMMARY OF THE INVENTION

An electrical hazard warning system is presented that combines the advantages of traditional orange cones with the visibility advantages offered by electrical hazard markers, resulting in a rugged, low-maintenance, high-reliability hazard marker that has a high visibility in both daylight and darkness, is compact and easily transportable, and is safe and environmentally-friendly.

The present hazard warning system includes two primary components: a rechargeable electrical hazard marker and a charger/storage unit. The hazard marker includes a rechargeable battery that supplies power to a flash tube, which produces flashes at two switch-selectable brightness levels: an intensely bright level for daylight use and a lesser brightness level for operation in darkness or diffused sunlight. A battery and flash tube are contained within a lightweight, non-skidding, topple-resistant cone-shaped housing designed for use in all weather conditions.

When not deployed in the roadway, the hazard markers are placed in the charger/storage unit, which protects and charges the markers. The charger/storage unit fits into the trunk of a car and is equipped with as many as six charging stations. The unit can receive a charging voltage from either a vehicle's electrical system or household AC (via an adapter), which is distributed to each charging station. Each station has a circuit breaker to protect it from a shorted battery or an overcurrent condition caused by a completely discharged battery, for example. Lights at each station indicate whether power is available or if a circuit breaker has tripped.

The hazard markers are designed for use with the charger/storage unit, and together make an excellent electrical hazard warning system. The hazard markers preferably illuminate immediately upon removal from the charger/storage unit, and can then be placed on the roadway as needed to provide a warning to the public and to protect both the public and the authorities at the scene.

Further features and advantages of the invention will be apparent to those skilled in the art from the following detailed description, taken together with the accompanying drawings.

DETAILED DESCRIPTION OF THE INVENTION

Figure 1:
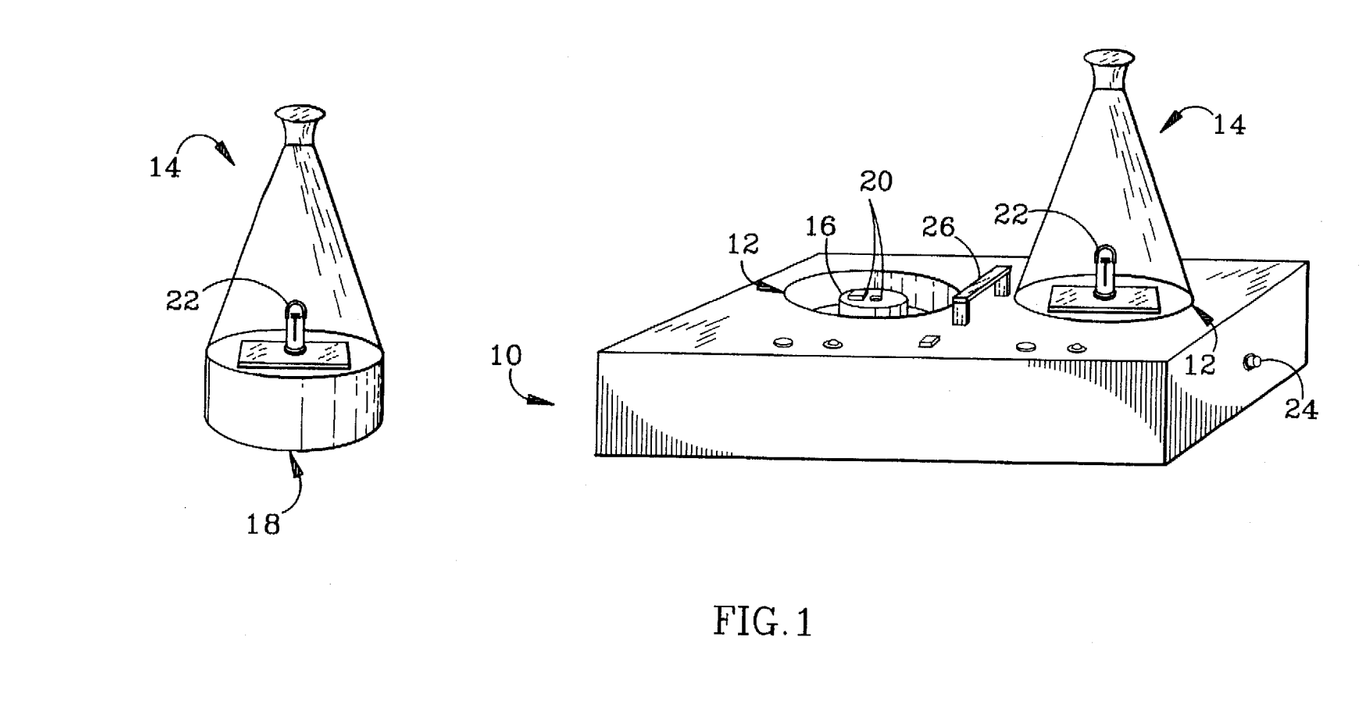
FIG. 1 is a perspective view illustrating the basic components of a hazard warning system per the present invention.

FIG. 1 illustrates the basic components of the present electrical hazard warning system. A charger/storage unit 10 contains at least one charging station 12, and each charging station is designed to accommodate one electrical hazard marker 14. The charger/storage unit is preferably provided in one, two, four and six station configurations. A receiving base 16 is located at the bottom of each charging station and is sized to fit into a recessed area 18 on the bottom of each hazard marker 14. The receiving base 16 has electrical terminals 20 that contact corresponding electrical terminals in the marker's recessed area 18. The terminals 20 conduct power from the receiving base 16 to the marker 14 to charge a battery located within each hazard marker, which in turn powers a lamp 22 when the marker is activated. The charger/storage unit 10 is preferably equipped with an electrical receptacle 24 for receiving the charging voltage, which will typically be provided by either a vehicle's electrical system or from an adapter connected to 115 Vac. The charger/storage unit preferably includes a carrying handle 26 which is retractable into the housing.

Figure 2A:
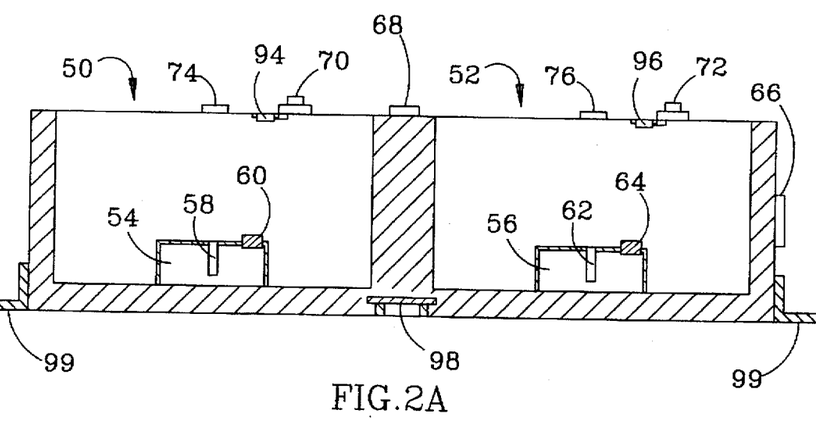
FIGS. 2A and 2B are sectional and top plan views, respectively, of a preferred charger/storage unit per the present invention.
Figure 2B:
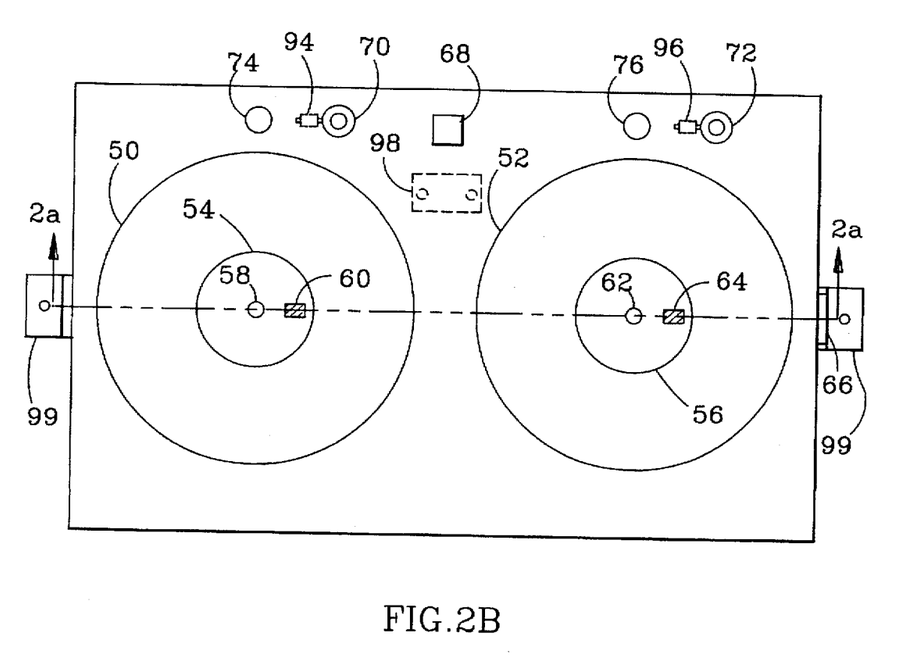

A preferred charger/storage unit is shown in FIGS. 2A (sectional view along axis 2A in FIG. 2B) and 2B (top plan view). The unit has two charging stations 50 and 52 that have a size and shape necessary to accommodate the hazard markers that will be used with the unit. The preferred hazard marker (discussed below) has a cylindrical base supporting a cone-shaped lamp area, with electrical terminals that are accessed from the underside of the base. A bucket-shaped charging station is suitable to hold a marker having this shape. The charging stations 50, 52 have respective receiving bases 54 and 56 designed to mate with a recessed area in the base of a hazard marker. Receiving base 54 has two terminals 58 and 60 that contact corresponding terminals on a hazard marker installed in charging station 50. Terminal 58 is the positive terminal and is preferably a conductive socket designed to mate with a pin-shaped terminal that extends from the base of a respective hazard marker. Terminal 60 is the negative terminal and is preferably a spring-loaded pin designed to make contact with a conductive ring mounted on the base of a respective hazard marker. Similarly, receiving base 56 has a positive terminal 62 and a negative terminal 64 that connect to corresponding terminals on a hazard marker installed in charging station 52.

Power is brought into the charger/storage unit via an electrical connector 66, is passed through a power switch 68, and is distributed to the charging stations 50, 52 (electrical lead lines are not shown in FIGS. 2A and 2B). The charging stations have respective resettable circuit breakers 70, 72 to protect the external power source. The charging stations also include respective indicator lights 74, 76 that light up green when power is available at that station, and red when the station's circuit breaker 70 or 72 is tripped.

Figure 3:
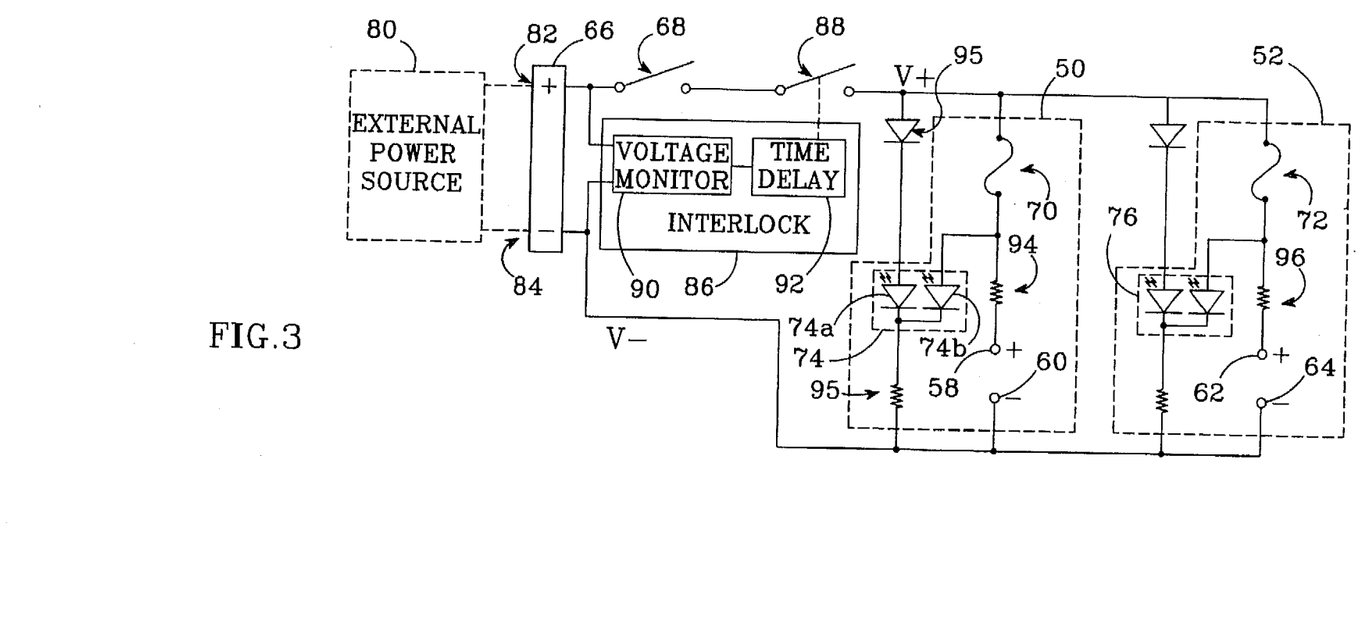
FIG. 3 is a schematic diagram of the charger/storage unit shown in FIGS. 2A and 2B.

An electrical schematic of the charger/storage unit of FIGS. 2A and 2B is shown in FIG. 3. The preferred hazard markers are each powered by a battery having a nominal output of 12 Vdc. Thus, the charger/storage unit requires a supply voltage of 13.5 to 14.5 Vdc to provide the necessary charging voltage to the hazard marker batteries. An external power source 80 provides the needed supply voltage. One convenient external power source is a vehicle's electrical system, which typically generates a voltage of 13.5 to 14.5 Vdc when the engine is running. The charger/storage unit can be hard-wired to the electrical system, or connected to the cigarette lighter via a cable. Another possible source of the supply voltage is household 115 Vac stepped-down and rectified with an AC adapter. The external power source 80 is connected to positive and negative terminals 82, 84 of charger/storage unit connector 66. Power switch 68 is connected in series with positive terminal 82 and connects the positive supply voltage to the rest of the charger circuitry when closed. Note that the negative supply voltage connected to negative terminal 84 can include ground.

The charger/storage unit preferably includes an interlock circuit 86 to prevent current from being drawn from a vehicle's electrical system when its engine is not running. The circuit 86 controls a switch in the form of a relay contact 88 which is connected in series with power switch 68. The circuit 86 is connected across the positive and negative terminals 82, 84 of connector 66 and includes a voltage monitoring circuit 90 which monitors the supply voltage level. When the supply voltage is below a threshold voltage needed for proper charging the relay contact 88 is opened, disconnecting the rest of the charger circuitry from the supply voltage. When the supply voltage is over the threshold, the relay contact 88 is closed. The circuit 86 preferably includes a time delay circuit 92 that requires the supply voltage to exceed the threshold voltage for a minimum amount of time before the relay contact 88 is closed, to insure that the vehicle's electrical system has stabilized after the engine is started. A threshold voltage of about 13.5 Vdc and a time delay of about 100 msec are acceptable values when the charger/storage unit receives its supply power from a typical 12 volt vehicle electrical system.

When the power switch 68 and relay contact 88 are both closed, the switched positive supply voltage (designated V+) is distributed to each charging station in the charger/storage unit. The negative terminal of connector 66 carries the negative side of the supply voltage (designated V−) to each charging station. For charging station 50, V+ is connected through a resettable circuit breaker 70 in series with a current limiting resistor 94 to the base's positive terminal 58. Circuit breaker 70 trips if the current passing through it exceeds a threshold, preferably 1 amp for the battery recommended for use in the preferred hazard marker (discussed below), which is indicative of a shorted or completely discharged battery. Current limiting resistor 94 is preferably 2 ohms when used with the preferred battery. The negative terminal 60 of receiving base 50 is connected to V−.

Indicator light 74 is preferably a three-terminal LED device containing one red and one green LED, respectively 74a and 74b. The anode of the red LED 74a is connected in series with the cathode of a diode 95 whose anode is connected to V+. The anode of the green LED 74b is connected to the node between circuit breaker 70 and current limiting resistor 94. The cathodes of both LEDs are connected through a current limiting resistor 95 to V−. When the circuit breaker 70 is not tripped and V+ is present (i.e., switch 68 and relay contact 88 are closed), the green LED 74b is forward-biased and light 74 is green, indicating that power is available at the station 50; red LED 74a is not lit because the voltage drop across it is insufficient to forward-bias the LED due to the voltage drop introduced by diode 95. If circuit breaker 70 has tripped and V+ is present, the red LED 74a is forward-biased and light 74 is red; green LED 74b goes off. If V+ is not present, light 74 will not be illuminated at all.

Charging station 52 works similarly, with circuit breaker 72 and current limiting resistor 96 connected in series with positive base terminal 62, and indicator light 76 giving charging station status. The preferred indicator lights 74, 76 are part number 351-3401 from Mouser Electronics Inc. of Mansfield, Tex. Individual LEDs may also be used, as may other types of low-voltage lamps.

The circuitry described for charging stations 50 and 52 is repeated for each charging station in the charger/storage unit. The charger/storage unit can include as few as one charging station, and is upwardly limited only by the capabilities of the external power source. When receiving power from a running vehicle, an upper limit of ten charging stations is recommended to prevent overburdening the vehicle's electrical system. The power switch 68, relay contact 88 and the charger/storage unit's wiring must all be appropriately sized to accommodate the current demands of the unit, which increase with the number of charging stations.

The charger/storage unit is preferably made from a durable, lightweight polymer material which provides for easy movement of the unit and rugged protection for the hazard markers it holds. The interlock circuit is preferably mounted on a circuit board 98 that is attached to the floor of the charger/storage unit with standoffs, for example. The charger/storage unit can be placed in a vehicle trunk, and, if desired, permanently mounted using mounting brackets 99. The unit can be similarly mounted to the wall or floor of a truck bed.

Figure 4A:
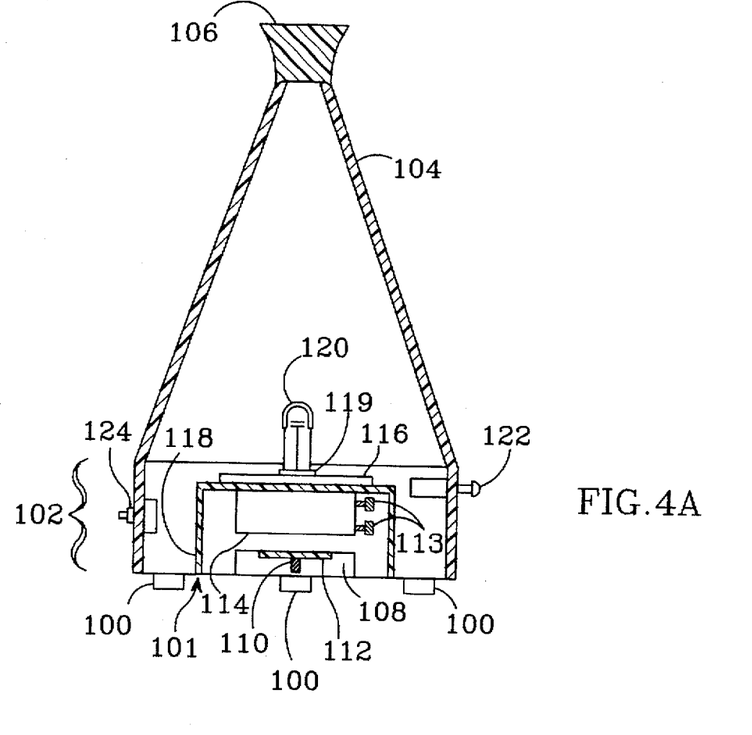
FIGS. 4A and 4B are sectional and bottom plan views, respectively, of a preferred hazard marker per the present invention.
Figure 4B:
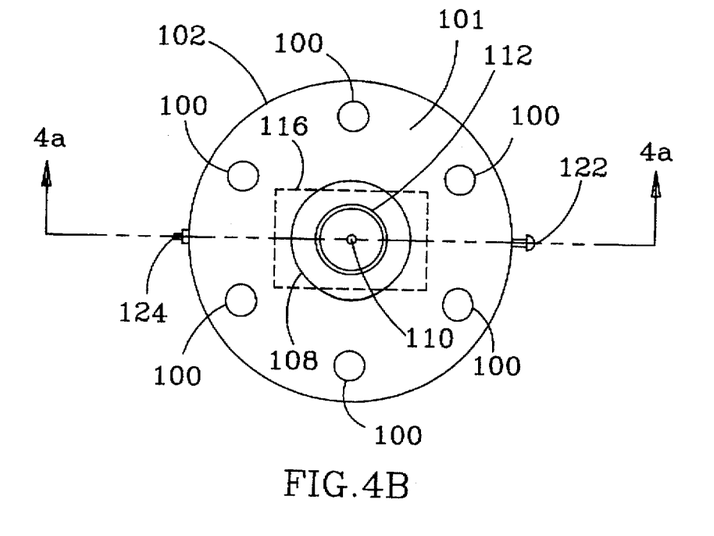

A preferred hazard marker is shown in FIGS. 4A (sectional view along axis 4A in FIG. 4B) and 4B (bottom plan view)(electrical lead lines are not shown in FIGS. 4A and 4B). The marker has six to eight rubber feet 100 mounted to and spaced approximately equally around the bottom 101 of a cylindrical base 102. A translucent plastic cone 104 is attached to the base at the cone's wide end, with a grasping knob 106 attached to the cone at its narrow end (cone 104 and knob 106 are not shown in FIG. 4B).

When used, the hazard marker stands on its feet 100 and rises vertically to its knob 106, resembling a conventional traffic cone. The marker is preferably at least 12 inches high so that it is easily visible when used as a hazard warning. The rubber feet 100 and the overall cone-shape help to keep the marker from skidding or tipping over in high-wind conditions, or if inadvertently jostled. Most of the hazard marker's components are located in the base 102, and this bottom-heavy design also helps to keep the marker upright. The translucent plastic cone 104 is preferably made from high-impact, scratch resistant redorange plastic. The grasping knob 106 is preferably encircled with a reflective ribbon to improve the hazard marker's visibility in the dark.

The bottom 101 of the base 102 preferably includes a recessed area 108 which is shaped to fit over the receiving base 54 in the charger/storage unit, and includes a positive terminal 110 and a negative terminal 112. The recessed area 108 is preferably circular and centered on the underside of the base 102. The positive terminal 110 is preferably pin-shaped and protrudes vertically downward from the center of the recessed area 108, so that when installed in the charger/storage unit's charging station 50, it protrudes into and makes electrical contact with the receiving base's socket-shaped positive terminal 58.

The hazard marker's negative terminal 112 is preferably a ring-shaped metallic contact affixed to the top of the recessed area 108, surrounding but spaced from positive terminal 110. The terminal 112 is positioned so that, when the hazard marker is installed in the charger/storage unit's charging station 50 it makes contact with the spring-loaded negative terminal 60 on the receiving base 54. By being ring-shaped, the respective negative terminals 60, 112 make contact as long as the receiving base 54 is inside of the recessed area 108, with no particular rotational orientation required. The same is true of the respective positive terminals 58, 110; since positive terminal 110 protrudes from the center of base 102, it will make contact with corresponding receiving base terminal 58 regardless of the marker's rotational orientation.

The base 102 houses a battery connector 113 which connects to the terminals of a battery 114 installed into the marker, and a circuit board 116, with the board and battery suitably held in place with a mounting bracket 118. A lampholder 119 is provided to hold and provide electrical connections to a lamp 120, preferably a high-intensity flash tube, and is connected to the circuit board 116 so that the light-emitting portion of the lamp extends up into the translucent plastic cone 104 (battery connector 113, battery 114, bracket 118, lampholder 119 and lamp 120 are not shown in FIG. 4B).

A lamp disable switch 122 and an intensity select switch 124 protrude through the exterior surface of base 102. The lamp disable switch 122 is preferably a spring-loaded plunger-type switch. When a hazard marker is installed in a charging station 50, the plunger of the switch 122 is pushed in by the interior wall of the charging station, which operates the switch and causes the lamp to be disabled while the battery is being charged. When the hazard marker is removed from the station 50, the spring-loaded plunger pops out so that the hazard marker lamp is enabled.

Intensity select switch 124 is preferably a weather-sealed three-pole pushbutton switch that cycles through HI, LOW, and OFF positions as the button is repeatedly pressed. The hazard marker produces a very bright light that is visible in daylight when the intensity switch is set to HI, and a light with a lesser brightness when the switch is set to LOW. When set to either HI or LOW position, the lamp 120 preferably illuminates immediately upon the popping out of the lamp disable switch 122 when the marker is removed from the charging station. Lamp disable switch 122 and intensity select switch 124 are connected to circuit board 116 as discussed below.

Figure 5:
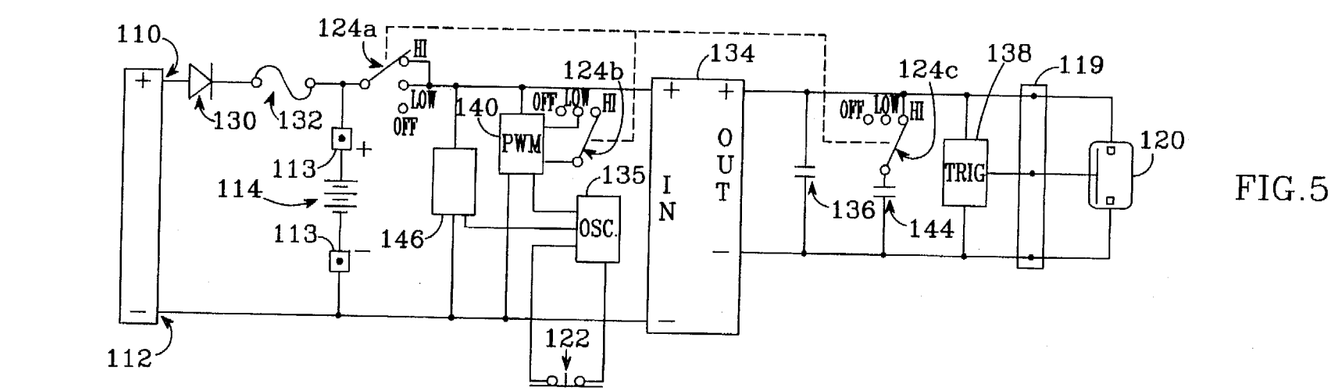
FIG. 5 is a schematic diagram of the hazard marker shown in FIGS. 4A and 4B.

An electrical schematic of the hazard marker is shown in FIG. 5. Power is brought into the marker from the charger/storage unit through positive terminal 110 and negative terminal 112. Positive terminal 110 is connected in series with a diode 130, a fuse 132, and the positive terminal of battery 114, whose negative terminal is connected to the marker's negative terminal 112; diode 130 and fuse 132 provide short-circuit protection to the external power source connected to the charger/storage unit. Diode 130 and fuse 132 also introduce a small voltage drop of about 0.7 volts to the incoming positive voltage. Assuming an incoming voltage of about 14.5 Vdc, a nominal charging voltage of about 13.8 Vdc is available to charge battery 114.

Hazard marker power is then switched through the first pole 124a of intensity select switch 124, which is closed when switch 124 is in either its HI or LOW positions. A conventional voltage inverter 134 driven by an oscillator circuit 135 receives the output of battery 114 and converts it to a higher voltage suitable for activating a highintensity flash tube 120. Preferably, battery 114 produces a nominal 12 Vdc output and the inverter 134 converts this to about 300 Vdc, which is sufficient to power the preferred flash tube.

The output of inverter 134 is connected to a capacitor 136. A conventional flash tube trigger circuit 138 is connected across capacitor 136 and to flash tube 120, which is made to repeatedly flash as follows: when the voltage across the capacitor 136 builds to about 300 Vdc, the trigger circuit causes flash tube 120 to flash one time, which discharges the capacitor. The inverter pumps current into capacitor 136 to again raise the voltage to the trigger point, causing the next flash to occur. This process repeats until intensity switch 124 is set to OFF, lamp disable switch 122 is depressed, or the battery voltage falls too low.

The second pole 124b of intensity select switch 124 is connected to a pulse width modulation (PWM) circuit 140 which is connected to oscillator 135. Setting switch 124 to its LOW position causes the PWM circuit to be activated. This causes the battery voltage delivered to the inverter 134 to be pulse width modulated so that it lowers the average current supplied to the inverter, which proportionately lowers the inverter's output current. Setting switch 124 to either HI or OFF positions disables the PWM circuit 140 so that the oscillator 135 driving inverter 134 runs freely and the output current produced by the inverter is increased.

The third pole 124c of switch 124 is connected to an additional capacitance 144. When switch 124 is set to HI, capacitance 144 is connected in parallel with capacitance 136, which allows more charge to accumulate before the trigger voltage of the flash tube is achieved, resulting in a brighter flash than is attained with a single capacitor on the LOW setting. Preferably, the flash tube 120 flashes at about the same rate for either HI or LOW switch settings —preferably about 1.5 to 2 flashes per second. This is accomplished by matching the ratio of capacitance change to the ratio of current provided by the inverter for the two switch positions. For example, assume capacitor 136 is about 1µF. If the inverter produces about 100 ma with intensity switch 124 set to LOW and about 200 ma when switch 124 is set to HI, capacitor 144 requires a value of about 1µF to maintain a consistent flash rate for the two switch settings. Thus, intensity select switch 124, PWM circuit 140 and capacitors 136 and 144 make up a variable light intensity circuit.

A battery protection circuit 146 is preferably connected across the battery 114 terminals to disable the inverter when the battery voltage drops below a threshold, preferably about 11.5 Vdc, to prevent the battery from becoming overdischarged. Lamp disable switch 122 is also connected to disable the inverter when its plunger is depressed, i.e., when the hazard marker is installed in a charging station, to prevent the lamp 120 from illuminating while the marker is being charged. The inverter is disabled in both cases by inhibiting the operation of oscillator 135.

The preferred lamp 120 is a xenon flash tube, part number U6020, available from Amglo-Chemlite Laboratories, Inc. of Bensenville, Ill. A suitable battery 114 for powering this lamp is a 12 volt, 4 amp-hour sealed lead-acid battery.

Pulse-width modulated inverters are well-known, and are discussed, for example, in Horowitz and Hill, *The Art of Electronics*, Cambridge University Press (1989), pp. 357–360. Flash tube trigger circuits are also well-known, and are discussed, for example, in Fink and Christiansen, *Electronics Engineers' Handbook*, McGraw-Hill, Inc. (1989), pp. 11-9 to 11-10.

The arrangement of electrical terminals connecting the charger/storage unit charging stations with their respective hazard markers is not limited to the pin and ring configuration described herein. It is preferable that a scheme be used which does not require the marker to be installed in a station with a particular orientation and in which the marker can be removed from the station simply by pulling it from the station by its grasping knob 106, so that the markers can be deployed quickly.

Figure 6:
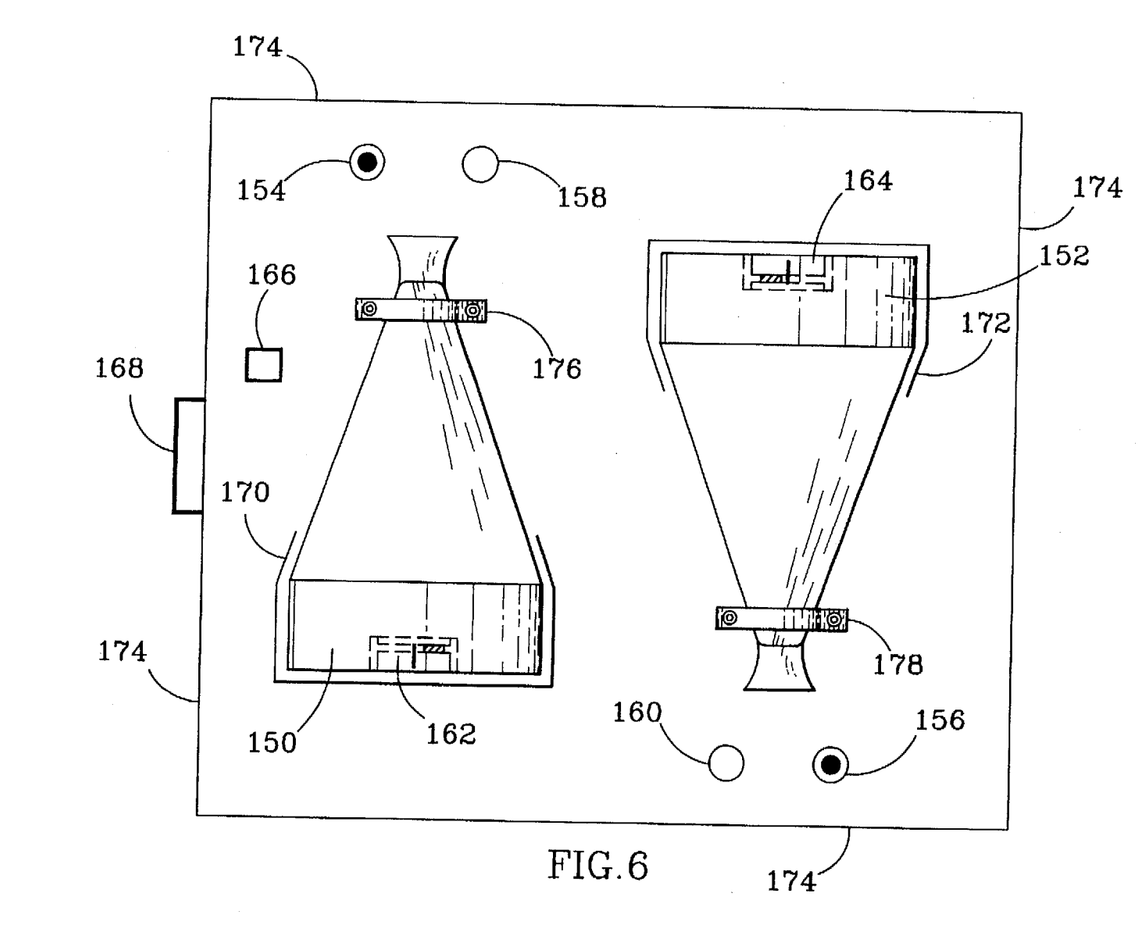
FIG. 6 is an alternative embodiment of a hazard warning system per the present invention.

A plan view of an alternative charger/storage unit is shown in FIG. 6, in which the hazard markers 150, 152 are laid on their sides adjacent to each other so that the markers alternately point in opposite directions. When compared to the arrangement of markers shown in FIGS. 1 and 2, the configuration of FIG. 6 results in a smaller volume being occupied for the same number of markers. This allows a smaller charger/storage unit to be used, which conserves space in the trunk of an automobile, for example. This style of charger/storage unit preferably has the same features as the unit shown in FIG. 2, including respective circuit breakers 154, 156, status indicators 158, 160 and receiving bases 162, 164 at each charging station, and a unit power switch 166 and electrical connector 168. The charging stations preferably include respective contoured wells 170, 172 into which respective markers are laid, which are shaped to snugly hold each marker in place, depress the marker's plunger switch, and keep the marker's electrical terminals in contact with its base's terminals. The hazard markers are preferably designed to fit into and be charged by either the charger/storage unit configuration of FIGS. 2A and 2B, or the configuration of FIG. 6, interchangeably.

The charger/storage unit shown in FIG. 6 can be laid flat, in which case the markers stay in place with the aid of gravity. Alternatively, the unit can be stood on one of its sides 174 and clamping straps 176, 178 or similar securing devices preferably used to help keep the markers 150, 152 in their respective charging stations.

A hazard warning system built per the present invention and using the components specified herein will operate for about 2 hours when the intensity switch 124 is set to HI, and for about 8 hours when set to LOW, assuming the battery 114 has been fully charged and the lamp 120 flashes at a rate of about 1.5 to 2 flashes per second.

While particular embodiments of the invention have been shown and described, numerous variations and alternate embodiments will occur to those skilled in the art. Accordingly, it is intended that the invention be limited only in terms of the appended claims.

We claim:

1. An electrical hazard warning system, comprising:
   a charging/storage unit comprising:
   at least one charging station which has electrical terminals to supply power to an electrical hazard marker installed in said station and is connectable to receive power from an external power source; and
   at least one electrical hazard marker, each comprising:
   a lampholder suitable for conducting electrical current to a lamp installed in said lampholder,
   a battery connector suitable for connecting to the terminals of a rechargeable battery and connected to supply electrical current to said lampholder,
   a housing which holds said lampholder and battery connector, is installable into one of said charging stations and has electrical terminals which make contact with said charging station's electrical terminals when so installed, said housing including a translucent plastic cone illuminated by a lamp installed in said lampholder and with opposed wide and narrow ends, a base attached to said wide end so that the marker can be deployed to stand vertically upon said base and rise to the narrow end of said translucent plastic cone, and
   a grasping knob attached to said narrow end of said translucent plastic cone;
   said at least one charging station and said at least one hazard marker being separate components arranged such that each of said hazard markers can be manually installed into and removed from a respective charging station,
   said at least one hazard marker being recharged when installed in a respective charging station when said station is connected to an external power source and providing a hazard warning capable of standing in a stable position on a highway when said hazard marker is removed from said at least one charging station.

2. The hazard warning system of claim 1, wherein said hazard marker includes circuitry for repeatedly flashing a lamp installed in said lampholder when a charged battery is connected to said battery connector.

3. The hazard warning system of claim 1, said at least one hazard marker further comprising a variable light intensity circuit which selectably controls the intensity of the light produced by a lamp installed in said lampholder.

4. The hazard warning system of claim 3, wherein said hazard marker includes circuitry for repeatedly flashing a lamp installed in said lampholder when a charged battery is connected to said battery connector, and said variable light intensity circuit includes circuitry which maintains the flash rate of said lamp approximately constant as said intensity is varied.

5. The hazard warning system of claim 1, wherein said at least one charging station is bucket-shaped and said at least one hazard marker stands vertically upon said base when installed in said at least one charging station.

6. The hazard warning system of claim 1, wherein said at least one charging station is configured to receive power from a vehicle's electrical system.

7. The hazard warning system of claim 6, wherein said at least one charging station includes an interlock circuit to prevent current from being drawn by the hazard warning system from a vehicle's electrical system when its engine is not running.

8. The hazard warning system of claim 6, wherein said at least one charging station includes an interlock circuit having a voltage monitoring circuit which prevents said charging station from drawing current from said electrical system when said system's voltage is below a predetermined threshold.

9. The hazard warning system of claim 1, wherein each hazard marker further comprises a lamp disable switch which is automatically operated when said hazard marker is installed in a respective charging station to inhibit the illumination of a lamp installed in said lampholder.

10. The hazard warning system of claim 9, wherein said lamp disable switch is arranged to automatically enable the illumination of a lamp installed in said lampholder immediately upon the removal of said at least one hazard marker from its respective charging station.

11. The hazard warning system of claim 1, wherein the electrical terminals of said housing are arranged to contact corresponding electrical terminals of a respective charging station when said housing is installed in said charging station, regardless of the rotational orientation of said housing with respect to said station.

12. The hazard warning system of claim 1, further comprising a lamp which is installed in said lampholder.

13. The hazard warning system of claim 12, wherein said lamp is a flash tube.

14. The hazard warning system of claim 1, further comprising a rechargeable battery which is connected to said battery connector.

15. The hazard warning system of claim 1, further comprising a mounting bracket for mounting said charger/storage unit to the interior of a vehicle trunk or truck bed.

16. The hazard warning system of claim 1, further comprising a reflective ribbon encircling said grasping knob to improve said hazard marker's visibility.

17. An electrical hazard warning system, comprising:
a charging/storage unit comprising:
at least two charging stations for recharging respective hazard markers, each of said charging stations having electrical terminals to supply power to an electrical hazard marker installed in said station and connectable to receive power from an external power source, said charging stations configured to receive said respective hazard markers laid down with adjacent markers pointing in opposite directions; and
at least one electrical hazard marker, each comprising:
a lampholder suitable for conducting electrical current to a lamp installed in said lampholder,
a battery connector suitable for connecting to the terminals of a rechargeable battery and connected to supply electrical current to said lampholder, and
a housing which holds said lampholder and battery connector, is installable into one of said charging stations and has electrical terminals which make contact with said charging station's electrical terminals when so installed, said housing including a translucent plastic cone illuminated by a lamp installed in said lampholder and with opposed wide and narrow ends, a base attached to said wide end so that the marker can be deployed to stand vertically upon said base and rise to the narrow end of said translucent plastic cone;
said at least one hazard marker being recharged when installed in a respective charging station when said station is connected to an external power source and providing a hazard warning when removed from said at least one charging station.

18. The hazard warning system of claim 17, further comprising a grasping knob attached to said narrow end of said translucent plastic cone.

19. A rechargeable electrical hazard marker suitable for use as a hazard warning to be deployed on the surface of a roadway, comprising:
a lampholder suitable for conducting electrical current to a lamp installed in said lampholder,
a battery connector suitable for connecting to the terminals of a rechargeable battery and connected to supply electrical current to said lampholder, and
a housing for said lampholder and battery connector comprising:
a translucent plastic cone which is illuminated by a lamp installed in said lampholder,
a base attached to said translucent plastic cone at said cone's wide end and upon which said hazard marker stands when said marker is placed on the ground,
a grasping knob attached to said cone's narrow end,
a mounting bracket for mounting a battery connected to said battery connector, and
electrical terminals attached to said base and wired to said battery connector to conduct power to recharge a battery connected to said battery connector, said base being installable in a separate charging station having electrical terminals corresponding to said electrical terminals attached to said base and through which power to recharge a battery is conducted;
said hazard marker capable of standing in a stable position on a highway and providing a high visibility hazard warning when illuminated.

20. The hazard marker of claim 19, further comprising a lamp which is installed in said lampholder.

21. The hazard marker of claim 20, wherein said lamp is a flash tube.

22. The hazard marker of claim 21, wherein said flash tube flashes at a rate of about 1.5 to 2 flashes per second.

23. The hazard marker of claim 19, further comprising a rechargeable battery which is connected to said battery connector.

24. The hazard marker of claim 9, further comprising a variable light intensity circuit which selectably controls the intensity of the light produced by a lamp installed in said lampholder.

25. The hazard marker of claim 24, further comprising a manually operated intensity select switch connected to said variable light intensity circuit for selecting a desired light intensity.

26. The hazard marker of claim 24, further comprising a flash tube which is installed in said lampholder and said variable light intensity circuit includes circuitry for causing the flash rate of said flash tube to remain about constant as said intensity is varied.

27. The hazard marker of claim 19, wherein said base has a top side which is attached to said translucent plastic cone and a bottom side having a recessed area which contains said electrical terminals, said terminals arranged to contact corresponding electrical terminals of a corresponding structure when said recessed area is placed in contact with said structure regardless of the rotational orientation of said housing relative to said structure.

28. The hazard marker of claim 27, wherein said housing's terminals comprise one pin-shaped terminal which protrudes from the center of said recessed area and one ring-shaped terminal surrounding but spaced from said pin-shaped terminal.

29. The hazard marker of claim 19, further comprising a lamp disable switch that when operated prevents a lamp installed in said lampholder from illuminating.

30. The hazard marker of claim 19, further comprising a plurality of rubber feet affixed to the underside of said base to inhibit skidding when the hazard marker is placed on the surface of a roadway.

31. The hazard marker of claim 19, wherein said base is heavier than said translucent plastic cone to inhibit toppling when the hazard marker is placed on the surface of a roadway.

32. The hazard marker of claim 19, wherein said marker has a height of at least 12 inches when standing on said base so that said marker is easily visible when used as a hazard warning.

33. A charger/storage unit suitable for charging and storing a plurality of electrical hazard markers, comprising:
  a housing connectable to receive power from an external power source, and
  a plurality of charging stations within said housing, each of said stations comprising:
    a receiving base which has electrical terminals wired to receive power from an external power source connected to said housing, said terminals arranged to contact corresponding electrical terminals on a hazard marker installed in a respective charging station, said receiving base's electrical terminals comprising one centered socket-shaped terminal suitable for receiving a corresponding pin-shaped terminal and one off-center spring-loaded pin-shaped terminal suitable for making contact with a corresponding circular ring-shaped terminal on a hazard marker so that electrical contact can be established between the charging station and the hazard marker for different rotational positions of the hazard marker in the charging station,
    a circuit breaker configured to protect an external power source connected to said housing, and
    an indicator configured to light when its respective charging station is receiving power.

34. The charger/storage unit of claim 33, further comprising a carrying handle attached to said housing.

35. The charger/storage unit of claim 34, wherein said carrying handle is retractable into said housing.

36. The charger/storage unit of claim 33, wherein said plurality of charging stations are bucket-shaped and said receiving base is located on the bottom of a respective charging station to accommodate a hazard marker which makes contact with and stands vertically upon said base when installed in said charging station.

37. The charger/storage unit of claim 33, wherein said charger/storage unit has at least two of said charging stations for charging respective hazard markers, said charging stations configured to receive said respective hazard markers laid down with adjacent markers pointing in opposite directions.

38. The charger/storage unit of claim 33, further comprising a mounting bracket for mounting said charger/storage unit to the interior of a vehicle trunk or truck bed.

39. The hazard warning system of claim 33, wherein said external power source is a vehicle's electrical system and said at least one charging station includes an interlock circuit to prevent current from being drawn by the hazard warning system from a vehicle's electrical system when its engine is not running.

40. The hazard warning system of claim 33, wherein said external power source is a vehicle's electrical system and said at least one charging station includes an interlock circuit having a voltage monitoring circuit which prevents said charging station from drawing current from said electrical system when said system's voltage is below a predetermined threshold.

41. The hazard warning system of claim 40, wherein each hazard marker further comprises a lamp disable switch which is operated when said hazard marker is installed in a respective charging station to inhibit the illumination of a lamp installed in said lampholder, and said lamp disable switch is arranged to enable the illumination of said lamp immediately upon the removal of said hazard marker from its respective charging station.

42. An electrical hazard warning system, comprising:
  a charger/storage unit suitable for charging and storing a plurality of electrical hazard markers, comprising:
    a housing connectable to receive power from an external power source, and
    a plurality of charging stations within said housing, each of said stations comprising:
      a receiving base which has electrical terminals wired to receive power from an external power source connected to said housing, said terminals arranged to contact corresponding electrical terminals on a hazard marker installed in a respective charging station,
      a circuit breaker configured to protect an external power source connected to said housing, and
      an indicator configured to light when its respective charging station is receiving power; and
  at least one electrical hazard marker, each comprising:
    a lampholder suitable for conducting electrical current to a lamp installed in said lampholder,
    a battery connector suitable for connecting to the terminals of a rechargeable battery and connected to supply electrical current to said lampholder, and
    a housing which holds said lampholder and battery connector, is installable into a respective charging station and has electrical terminals which contact with the electrical terminals of said charging station's receiving base when so installed;
    said electrical terminals comprising a pin-shaped terminal protruding from one of said housing and receiving base which contacts a corresponding centered socket-shaped terminal on the other of said housing and said receiving base when said housing is installed in a respective charging station, and a circular ring-shaped terminal on one of said housing and receiving base which contacts an off-center spring-loaded pin-shaped terminal on the other of said housing and said receiving base when said housing is installed in a respective charging station, said housing and receiving base terminals arranged so that electrical contact is established between said protruding pin-shaped terminal and said centered socket-shaped terminal and between said circular ring-shaped terminal and said off-center spring-loaded pin-shaped terminal regardless of the rotational orientation of said housing relative to said receiving base, said at least one hazard marker being recharged when installed in a respective charging station when said charger/storage unit housing is connected to an external power source and providing a hazard warning when removed from said charging station.

43. The hazard warning system of claim 42, wherein said at least one hazard marker includes circuitry for repeatedly flashing a lamp installed in said lampholder when a charged battery is connected to said battery connector.

44. The hazard warning system of claim 42, said at least one hazard marker further comprising a variable light intensity circuit which selectably controls the intensity of the light produced by a lamp installed in said lampholder.

45. The hazard warning system of claim 42, wherein each hazard marker further comprises a lamp disable switch which is operated when said hazard marker is installed in a respective charging station to inhibit the illumination of a lamp installed in said lampholder, and said lamp disable switch is arranged to enable the illumination of said lamp immediately upon the removal of said hazard marker from its respective charging station.

46. The hazard warning system of claim 42, wherein the electrical terminals of said hazard marker housing are arranged to contact corresponding electrical terminals in the receiving base of a respective charging station when said hazard marker housing is installed in said charging station, regardless of the rotational orientation of said housing with respect to said station.

47. An electrical hazard warning system, comprising:

a charging/storage unit comprising:

at least one charging station which has electrical terminals to supply power to an electrical hazard marker installed in said station and is connectable to receive power from an external power source; and at least one electrical hazard marker, each comprising:

a lampholder suitable for conducting electrical current to a lamp installed in said lampholder, a battery connector suitable for connecting to the terminals of a rechargeable battery and connected to supply electrical current to said lampholder, a housing which holds said lampholder and battery connector, is installable into one of said charging stations and has electrical terminals which make contact with said charging station's electrical terminals when so installed, said housing including a translucent plastic cone illuminated by a lamp installed in said lampholder and with opposed wide and narrow ends, a base attached to said wide end so that the marker can be deployed to stand vertically upon said base and rise to the narrow end of said translucent plastic cone, and a grasping knob attached to said narrow end of said translucent plastic cone;

said hazard marker's electrical terminals arranged to contact the electrical terminals of a respective charging station when said hazard marker housing is installed in said charging station regardless of the rotational orientation of said housing with respect to said station, said at least one charging station and said at least one hazard marker being separate components arranged such that each of said hazard markers can be manually installed into and removed from a respective charging station, said at least one hazard marker being recharged when installed in a respective charging station when said station is connected to an external power source and providing a hazard warning capable of standing in a stable position on a highway when said hazard marker is removed from said at least one charging station.

* * * * *